Aug. 24, 1965  G. W. OSBORNE  3,202,234
ELECTRIC MOTOR DRIVEN VEHICLE HAVING DRIVER
CONTROLLED VARIABLE SPEED DRIVE
Filed June 1, 1962  3 Sheets-Sheet 1
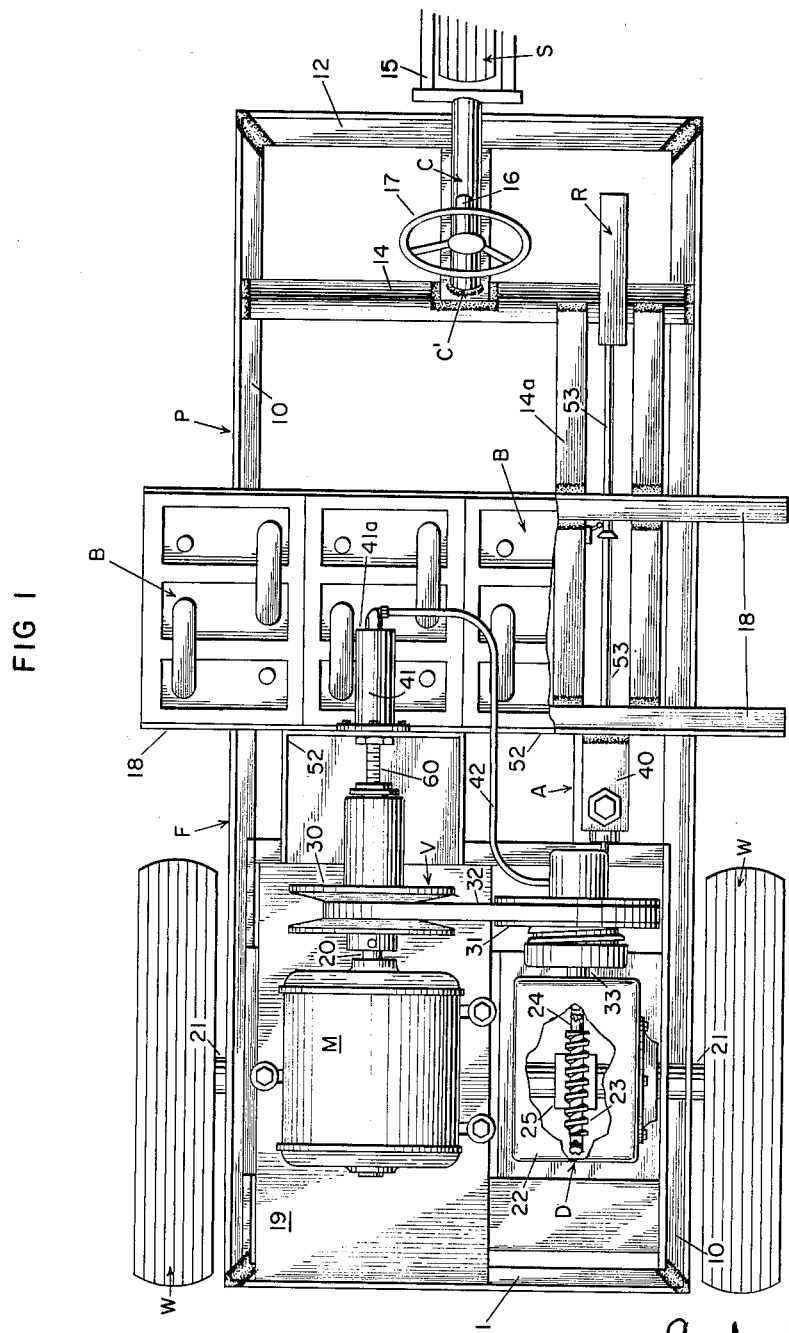
Gordon W. Osborne
Inventor
Peck & Peck
Attorneys.

Aug. 24, 1965 G. W. OSBORNE 3,202,234
ELECTRIC MOTOR DRIVEN VEHICLE HAVING DRIVER
CONTROLLED VARIABLE SPEED DRIVE
Filed June 1, 1962 3 Sheets-Sheet 2
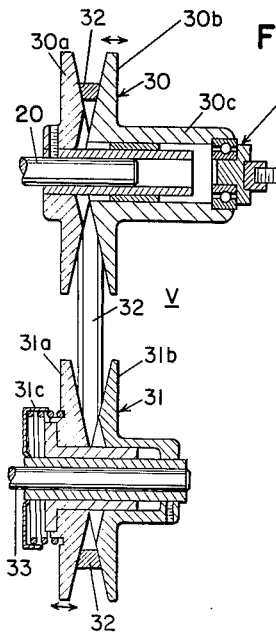
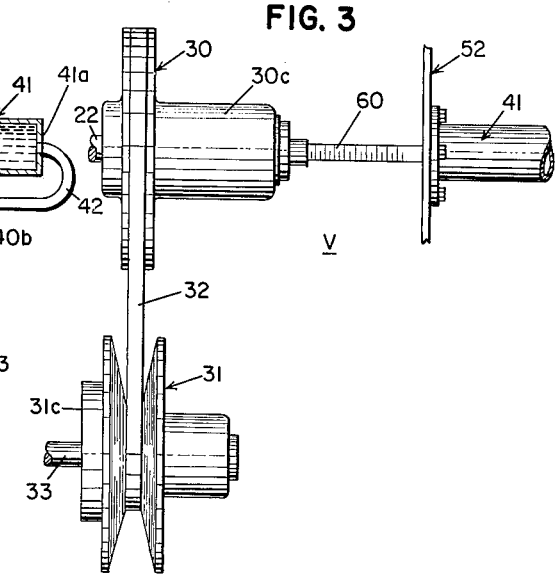
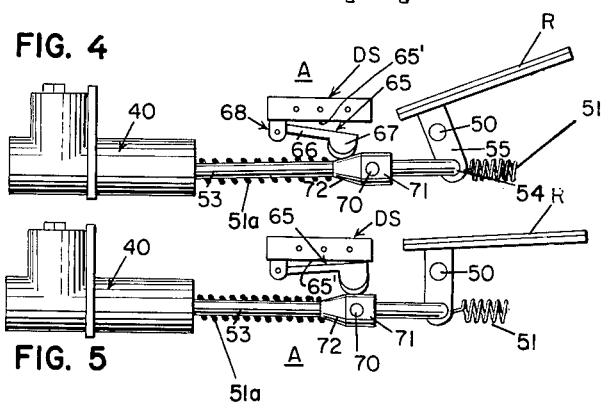
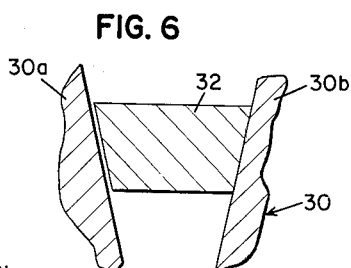
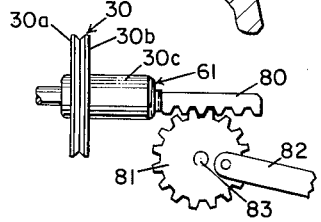
Gordon W. Osborne
Inventor
Peck & Peck
Attorneys Aug. 24, 1965    G. W. OSBORNE    3,202,234
ELECTRIC MOTOR DRIVEN VEHICLE HAVING DRIVER
CONTROLLED VARIABLE SPEED DRIVE
Filed June 1, 1962    3 Sheets-Sheet 3

Gordon W. Osborne
Inventor
Peck + Peck
Attorneys.

United States Patent Office 3,202,234
Patented Aug. 24, 1965

3,202,234
ELECTRIC MOTOR DRIVEN VEHICLE HAVING DRIVER CONTROLLED VARIABLE SPEED DRIVE
Gordon W. Osborne, 180 Raeburn Ave., Rochester 19, N.Y.
Filed June 1, 1962, Ser. No. 199,489
3 Claims. (Cl. 180—65)

My present invention relates to the provision of an electric motor driven vehicle of the so-called industrial cart type having a driver controlled variable speed drive; and the nature and objects of the invention will be readily recognized and understood by those skilled in the arts to which the invention relates in the light of the following explanation and detailed description of the accompanying drawings illustrating what I now believe to be a preferred embodiment or electrical and mechanical expression of an electric motor driven vehicle having a driver controlled variable speed drive of my invention from among various other embodiments, expressions, designs, constructions and combinations of which the invention is capable within the broad spirit and scope thereof as defined in and by the claims hereto appended.

The invention is concerned with and directed particularly to the solution of certain problems encountered with electric powered vehicles of the so-called industrial vehicle or "cart" types, such as typified by the electric powered golf carts now in widespread use on golf courses. These electric powered industrial type vehicles or carts are usually driven or propelled at the desired rates of speed by selectively controlling the rates of speed of operation of the electric motor which drives the vehicle and which motor is powered by storage batteries installed on and carried by the vehicle. The rate of speed of the driving motor for such a vehicle is generally controlled by selectively varying the voltage supplied to the motor from the batteries through the medium of a suitable stepping switch or a system of a series of resistance elements providing for different voltage outputs from such steps or resistance elements, respectively. The selective operation of the stepping switch, system of resistance coils, or other suitable voltage selecting means, is manually controlled by the operator or driver of the vehicle through a suitable manually operable member, such for example, as a foot operated accelerator pedal. Thus with these vehicles the speed of the driving motor itself is varied in order to control and determine the rate of speed of propulsion of the vehicle, and the motor is only driven at its highest or top rate of speed and maximum torque when it is desired to propel the vehicle at its highest or top rate of speed.

In the use and operation of such electric powered vehicles or carts, so speed controlled, the slowest or starting speed of the vehicle is attained by reducing the voltage output from the batteries to the motor to the lowest voltage output, which low voltage is then supplied to operate the motor at its lowest or starting speed. In such a starting or low speed condition of operation a high current drain on the batteries results because of the resistance that is necessarily used to reduce the normal voltage from the batteries to the desired low voltage. Similarly, there is a continuing but decreasing battery drain due to the resistances necessarily used in operating the vehicle through the different speed steps through the speed range from lowest speed to highest or top speed for the vehicle. The highest speed of the motor and the resulting top speed of propulsion of the vehicle is attained only when the maximum voltage of which the batteries are capable is permitted to be supplied by the selective voltage reducing stepping switch or other suitable voltage reducing means to the motor through the operator control thereof.

When such a vehicle or cart so driven and speed controlled encounters and must climb grades or hills, such for example as encountered on a golf course, or ramps or such like inclined surfaces as are encountered by industrial use, difficulties are met with because the power required for the vehicle to climb such grades frequently results in overloading the motor due to the high (gear) ratio between the electric driving motor and the driving or traction wheels of the vehicle. When such motor overloading occurs, a very high current drain on the batteries results so that the life of the charge of the batteries is thereby greatly reduced and shortened. In the use of such electric powered carts on golf courses it has been found, for example, that in many instances the batteries powering such a cart of the usual size, weight and power for golf course use may require recharging after only a single trip around an 18-hole golf course. When the batteries of such a cart must be recharged, the cart is, of course, removed from service and in addition to charging costs there are the costs of time and labor involved in changing and replacing the charged batteries, which added to the loss of services of the cart have resulted in decreasing use of such electric powered carts because of the over-all cost of their operation and maintenance. This is true even though the electric battery powered carts have the important advantages of quietness, cleanness and safety in operation and in the storage facilities and supplies required for them, thus making them available for use in a wider range of locations and characters of operating conditions.

It is, therefore, a primary object of my present invention to overcome the foregoing and other problems and difficulties presently encountered with electric powered industrial type vehicles or carts by providing such a cart which under the conditions encountered in operation and use will give substantially longer life to the batteries powering the vehicle so that less frequent recharging thereof is required, while at the same time providing for better and safer control and flexibility of operation of the vehicle with substantial increase in the ability of the vehicle to climb hills or grades and meet other operating conditions without overloading the motor.

Another object is to provide such an electric powered industrial vehicle or cart having the above characteristics and advantages which will be of a relatively simple and uncomplicated design and construction capable of being manufactured and marketed within economically feasible price ranges.

Another object is to provide an electric powered industrial type cart which will require a minimum of maintenance, both electrical and mechanical, even under the conditions to which subjected by operation of the cart by numbers of different drivers having varying degrees of skill and experience in the handling and driving of such types of vehicle.

A further object is to provide an electric powered, electric motor driven, industrial type cart in which the electric motor is at all times operated at its highest or top rate of speed and torque, including the at rest condition of the vehicle with the motor running, to and through the start and low speed, the high or top speed, and the intermediate speeds between the low and top speeds, of propulsion of the vehicle.

Another object is to provide an operator or driver controlled, infinitely variable speed selector drive mechanism between the electric motor and the driving or traction wheels of such an industrial type cart by which the electric motor may be operated at its highest rate of speed and torque at all times and the speed of propulsion of the cart may be determined by changing the ratio (gear) between the motor and the traction wheels of the cart.

A further object is to provide as the variable speed selector drive mechanism for such a cart, an infinitely variable pitch diameter sheave and belt arrangement connecting the motor with the traction wheels of the cart for control by the driver by selectively varying the pitch diameters of the sheaves through the range thereof from a neutral, non-driving setting through low to high (gear) ratio settings for propelling the cart at the desired or required rates of speed to meet the driving conditions encountered at any time by the cart.

Another object is to provide an efficient and simple design and arrangement of driver operated and controlled actuating mechanism for selectively operating the infinitely variable speed selector drive to any desired setting within the range of such drive.

A further object is to provide a driver operated actuating mechanism for the infinitely variable speed selector drive of the hydraulic type having a minimum of parts which may be readily installed and assembled on the cart and which will be positive in operation and require a minimum of maintenance under the conditions encountered in operation and use.

Another object is to control the power circuit from the batteries to the motor by the operator or driver controlled actuating mechanism for the variable speed selector drive in such a manner that the power circuit is opened and the motor is out of operation when the operator controlled actuating mechanism is in its at-rest position with the drive in its neutral, non-driving connection with the motor and to close the power circuit and immediately place the motor in top or high speed and maximum torque operation in advance of the speed selector drive reaching start and low speed setting by continued movement of the driver controlled actuating mechanism from its at-rest position, and to maintain the power circuit closed during movement of the driver controlled actuating mechanism from position for lowest speed setting of said speed selector drive to the at-rest position of the actuating mechanism and neutral setting of the selector drive.

And another object is to provide an operator-controlled actuating mechanism for the variable speed selector drive and for controlling the power circuit to the motor, which actuating mechanism includes a foot operated pedal that is continuously biased to an upwardly swung position with the selector drive in neutral and the power circuit open, and which on initial depression closes the power circuit and then on further depression will place the drive in low ratio (gear) for starting drive of the vehicle, and thereafter by progressive depression will progressively and infinitely vary the selector drive to progressively infinitely vary the ratio (gear) between the motor and the traction wheels of the cart from low to high ratio (gear) so that with the pedal in its fully depressed position the cart is propelled at its highest rate of speed.

With the foregoing and various other objects, features and results in view which will be readily apparent to and recognized by those skilled in the arts to which my invention relates from the following explanation and detailed description, my invention consists in certain novel features in design and in construction of parts, elements and components, and in combinations thereof, all as will be more fully and particularly referred to and specified hereinafter.

Referring to the accompanying drawings in which similar reference characters refer to corresponding parts and elements throughout the several figures thereof:

FIG. 1 is a top plan view of an electric motor-driven, battery-powered industrial cart of the three-wheeled type primarily intended for indoor use and incorporating an embodiment of the driver-controlled variable speed drive of my invention, the body of the cart having been removed.

FIG. 2 is a horizontal sectional view through the infinitely variable sheave and belt drive unit of my invention showing the master and slave cylinders of a hydraulic driver-operated selective actuating mechanism of the invention in operative connection therewith.

FIG. 3 is a view in top plan of the infinitely variable sheave and belt unit of FIG. 2 with the sheaves being shown varied to and set in high speed driving condition.

FIG. 4 is a side elevational view of the driver-operated hydraulic actuating mechanism for the variable sheave and belt drive unit with the motor circuit switch in operative connection therewith, the actuating mechanism and the motor circuit switch being shown in the circuit open position with the driver-operated control pedal in its elevated position.

FIG. 5 is a side elevational view similar to FIG. 4 but showing the operating pedal in fully depressed position with the motor circuit switch in closed position for maximum high speed propulsion of the cart.

FIG. 6 is a detail sectional view through a sheave and belt of the variable sheave and belt drive unit, showing the belt in non-operating engagement in the sheave when the drive unit is in its neutral and non-driving position.

FIG. 7 is a detail view in side elevation, more or less diagrammatic, showing a mechanical rack and pinion form of pedal-operated actuating mechanism for selectively varying the sheave and belt drive unit.

Figure 8:
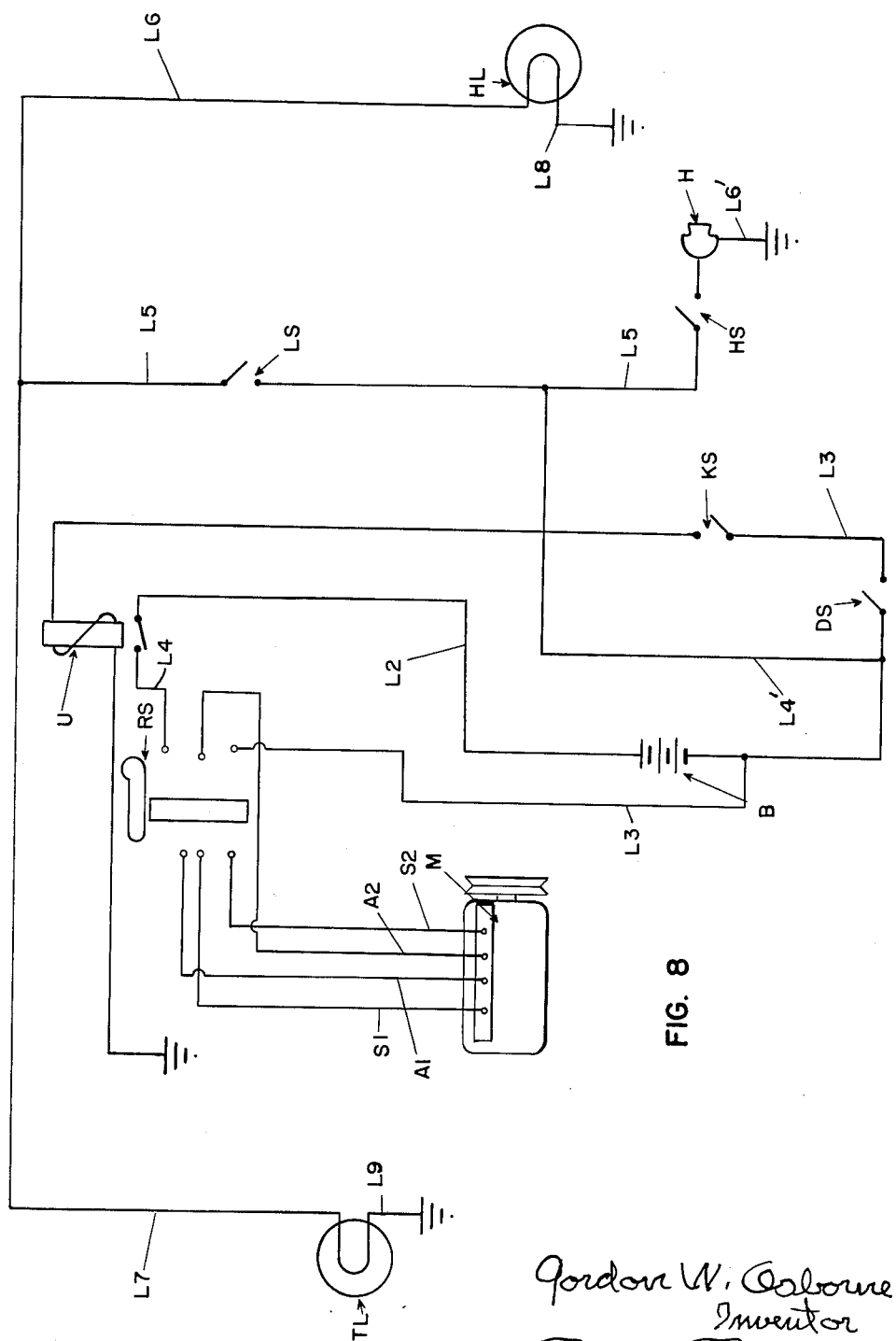
FIG. 8 is a wiring diagram of the power and auxiliary unit circuits for the electric motor and battery powered cart of FIG. 1.

I have selected and illustrated in FIG. 1 of the accompanying drawings, as one example embodiment of my invention, an electric powered industrial cart of the type particularly designed and intended for use inside of buildings, such as factories and industrial plants where the vehicle must be driven through passageways, doorways, aisles, corridors and and such like, that may be of relatively narrow width and where the vehicle may be required to make very short and even right angle turns. The example cart of FIG. 1 is generally identified by the reference character P and to meet the space requirements for operation inside of buildings it is of overall width, length and height dimensions as small as practically possible. In order to meet the requirements for sharp turns the cart P is of the three-wheel type and is provided with the two (2) rear powered driving or traction wheels W and the single, steerable front wheel S mounted for horizontal rotation or swinging about a vertical axis intersecting the longitudinal or fore and aft axis of the cart for directionally controlling the cart.

The industrial cart P of FIG. 1 includes the main frame identified generally by the reference character F mounted and supported by the rear wheels W and the single front steering wheel S. The frame F includes the side beam members or sills 10, the rear end cross frame member 11, the front end cross frame member 12, and the cross members 14 extending spaced a distance inwardly from the front end cross member 12 and extending across and between the side sills 10.

The single front, steering wheel S is mounted on and supported from the forwardly and upwardly extending, centrally located beam structure C positioned at the forward end of frame F and rigidly fixed thereto as by welding the lower end C' thereof to and between the front cross member 12 and the inwardly spaced cross members 14 as indicated in FIG. 1 of the drawings in which only the lower length portion of the beam structure C is shown. The wheel S is mounted in the usual manner in a fork unit 15 mounted and supported on beam structure C and an upwardly and rearwardly inclined steering post 16 is provided for rotating steering wheel S about a vertical axis that intersects the longitudinal or fore and aft axis of the cart for directional control of the cart. The upper end of the steering post 16 mounts a steering wheel 17 which is located in position for ready steering access to the driver of the cart. The mounting and steering gear arrangement for the single front wheel S may be carried out in any of the usual and well-known manners familiar in this art and forms no part of my present invention.

The industrial cart P, in this particular example, is electrically powered by four (4) 6-volt storage batteries B with a total voltage output of 24 volts. These batteries B are in the example cart removably mounted on and carried at an intermediate location on the frame F by a rack comprised of the spaced, parallel cross rails 18 fixed in a position extending transversely over and across the frame F and its side sills 10. These batteries B power and drive an electric motor M that is mounted on a platform or horizontally disposed supporting structure 19 secured on the frame F at a location thereon across but above the axis line of the rear wheels W of the cart. The motor M is positioned on the frame F at a location to the left-hand side of the cart with the motor shaft 20 extending forwardly from the forward end thereof and positioned generally parallel with the longitudinal axis of the cart and normal to the axis of the rear wheels W, as will be clear by reference to FIG. 1.

The powered rear traction wheels W are mounted in any usual manner familiar in this art and are driven by the usual axle shafts shown more or less diagrammatically in FIG. 1, each of said axle shafts being identified generally by the reference character 21. The axle shafts 21 lead to and are operatively connected at their inner ends into opposite sides, respectively, of the usual or any desired differential unit D. This differential unit D is mounted on the frame F adjacent the motor M opposite the inner side of the latter on the right-hand side of the cart. The differential unit D includes the housing 22 and mounts therewithin the worm 23 and worm wheel 24 connected directly to the differential spider assembly identified generally by the reference character 25. The axle shafts 21 are connected at their inner ends in the usual manner into opposite sides, respectively, of the differential spider assembly 25 so that power driving of the worm 23 will effect independent driving of the rear traction wheels W, all as will be familiar to and readily understood by those skilled in this art.

The motor M is connected in a current supply circuit with the batteries B so that when such circuit is closed, the motor is placed in operation, and when the circuit is opened, operation of the motor is stopped. A basic wiring diagram for the example cart P which includes the power supply circuit to the motor M, is shown in FIG. 8 of the accompanying drawings. The wiring circuits for the cart P include the power supply lines L2 and L3 from the batteries B to the 12-volt solenoid unit U, through the line L4 from unit U to and through the reversing switch RS, and by lines S1, A1, A2 and S2 to the motor M. A driver operated switch DS is connected in line L3 of the power circuit from the batteries B to the motor M, and a key switch KS is also connected in line L3 between switch DS and the solenoid operated unit U. The cart P in this example is equipped with a headlight HL, taillight TL, and a horn H, the circuits for which include current supply line L4' from line L3 to line L5 through a horn switch HS to horn H and from horn H to ground by line L6'. A light controlling switch LS is connected in line L5, and the headlight HL and taillight TL are connected into line L5 by lines L6 and L7, respectively, with the headlight and the taillight being each grounded by lines L8 and L9, respectively.

In accordance with my invention the motor M is connected directly to and receives the full 24-volt output from the batteries B by the power supply circuit which includes the lines L2, L3 and A1, S1, A2 and S2 having the driver operated main circuit control switch DS and the driver operated, independent reversing switch RS connected therein. However, this power supply circuit provides and includes no voltage reducing resistances or other conditions that will cause substantial voltage reduction, so that when the switch DS is closed, the full 24-volt output from the batteries B is supplied to the motor M with the latter being operated at all times when the current supply circuit is closed at its full or maximum speed and torque.

Following that teaching of my invention which requires operating the motor M at its maximum speed and torque at all times and for all speeds of propulsion of the cart P, I provide an infinitely variable speed drive unit identified generally in FIG. 1 by the reference character V between the motor M and the differential unit D by which the speed of drive of the traction wheels W may be infinitely varied throughout the range of the drive unit. I then selectively operate the drive unit V through a driver controlled actuating mechanism generally identified by the reference character A in FIG. 1, which mechanism includes a foot pedal R located on the frame F in the cart in position for actuation by the foot of a driver when seated in driving position on the cart.

I have selected as an example form of an infinitely variable speed drive unit V, an arrangement of variable pitch diameter sheaves 30 and 31 operatively connected by a V-belt 32. The variable pitch diameter sheave 30 is mounted on, fixed to and driven by the shaft 20 of the motor M, while the variable pitch diameter sheave 31 is mounted on, fixed to and drives the input shaft 33 of the differential unit D, so as to thereby drive the worm 23 of that unit. Thus the variable pitch diameter sheave 30 is driven by the motor M which is constantly operated at its maximum speed and torque during all periods of its operation. Referring now to FIGS. 2 and 3, in connection with FIG. 1, the sheaves 30 and 31 of the drive unit V are of the variable pitch diameter types with the sheave 30 including the opposed faces 30a and 30b and with the sheave 31 including the opposed faces 31a and 31b. The opposed faces of each sheave provide a V-groove therearound and therebetween and are capable of axial movements relative to each other to thereby vary the pitch diameter provided by the belt groove of the sheave. This variable pitch diameter type of sheave is familiar in the art and it is not believed that a detailed structural description thereof is necessary herein.

In the example drive unit V the driving sheave 30 which is driven by the motor M has the face 30a thereof fixed against axial movement, while the face 30b thereof is constructed and mounted for movement axially toward and from the face 30a. In this instance the movable face 30b includes an axially extended hub or sleeve portion 30c to which a suitable positively displaced actuating member is suitably connected, as will be more fully explained hereinafter. The driven sheave 31 has the face 31a thereof axially movable toward and from the face 31b and is spring loaded and biased by a spring unit 31c which acts to continuously bias or move the face 31c inwardly toward the face 31b, all in a manner well understood by those familiar with such type of spring loaded, variable pitch diameter sheaves. The V-belt 32 is mounted on and between the sheaves 30 and 31 in operative relation in the belt grooves provided by the sheaves, and in this particular drive unit V when the face 30b of sheave 30 is in its position of outermost axial movement for neutral or non-driving position of the unit V, the biasing spring 31c of sheave 31 is expanded with the sheave 31a in its maximum position of movement axially inwardly toward the face 31b. In the foregoing relative positions of the sheaves 30 and 31, the length of the V-belt 32 is such that it has a loose, non-driving contact and engagement with the effective operating surfaces of the sheaves, that is to say, the belt 32 will then have non-driving slippage in the sheaves so that rotation of sheave 30 will not rotate and drive sheave 31.

The infinitely variable speed drive unit V is shown in FIG. 2 in a low driving ratio (gear) position for low speed propulsion or drive of the cart P, while in FIG. 3 of the drawings the sheaves 30 and 31 with the belt 32 are shown in their high speed ratio (gear) settings for driving the cart P at its maximum speed for propulsion. In FIG. 6 of the drawings I have indicated the loose or "slippage" relation of the belt 32 to the opposing faces of a sheave 30 or 31 when the latter are in general setting, the faces 30a and 30b of the sheave 30 being indicated in this FIG. 6.

The driver operated actuating mechanism A for selectively operating the variable speed drive unit V is shown in the example hereof as of the hydraulic type. This mechanism A is operatively connected with the hub 30c of face 30b of sheave 30, and is under the selective operating control exercised by a driver through foot operation of the pedal R. This hydraulic actuating mechanism A includes a master cylinder 40 and a slave cylinder 41 connected with the master cylinder by a fluid line 42. The master cylinder 40 includes the piston or plunger 43 reciprocally mounted therein and the slave cylinder 41 includes the piston 44 reciprocally therein and continuously biased toward the intake end 41a of cylinder 41 by the biasing spring 45. This piston 44 is displaced against and compresses the biasing spring 45 by the displacement and discharge of fluid under pressure from the master cylinder through line 42 into the intake end 41a of the slave cylinder 41. The master cylinder 40 is supplied and provided with a body of fluid 46, such as oil, and this body of fluid charges the fluid line 42 and the cylinder 41 between the piston 44 and the inlet end 41a of the cylinder. With the piston 43 of the master cylinder retracted therein to and held in its maximum position of retraction at the end 40a of the cylinder opposite the discharge end 40b thereof, the biasing forces exerted by the spring 45 take command and displace piston 44 to its maximum position of inward displacement toward the intake end 41a of the cylinder 44. When the piston 43 of the master cylinder 40 is forced inwardly in cylinder 40 toward the discharge end 40b thereof, the fluid 46 is forced under pressure through line 42 and into the slave cylinder 41 to thereby overcome the biasing forces exerted by the spring 45 and force the piston 44 toward the end 41b of cylinder 41, thereby placing the spring 45 under compression. When the pressure forcing piston 43 inwardly of the master cylinder inwardly is released, the biasing spring 45 of the slave cylinder 41 then takes charge and forces fluid 46 through line 42 into the master cylinder 40 to thereby force the piston 43 to its retracted position.

In the example cart P of FIG. 1 the pedal R is pivotally swingably mounted on a suitable horizontal pivot 50 located below the pedal adjacent the rear end thereof with the pivot 50 suitably supported on and from the cross members 14 of the frame F in a position disposed substantially parallel with the adjacent side sill 10 of the frame at, in this example, the right-hand side of the cart, as shown in FIG. 1. Thus mounted, the pedal R may be vertically swung upwardly or downwardly about the pivot 50.

A generally vertically disposed supporting bracket structure positioned transversely of frame F is identified generally in FIG. 1 of the drawings by the reference character 52. This bracket structure 52 is secured on and across the frame F of cart P between the motor M and the differential unit D and the rearmost rail 13 of the battery mounting rack. The master cylinder 40 of the hydraulic actuating mechanism A for selective operation of the variable speed drive unit V is mounted in horizontally disposed position on the bracket structure 52 extending rearwardly therefrom in general axial alignment with the longitudinal center of the pedal R. This mounting and positioning of the master cylinder 40 is a fixed and rigid mounting and the plunger rod 53 of the piston 43 of this master cylinder extends forwardly to and is pivotally connected at its forward end at 54 to the lower end of a crank arm 55 depending from the pedal R with this crank arm at its upper portion pivotally mounting the pedal R on the pivot 50. The length of the plunger rod 53 of the master cylinder 40 is such that with the pedal R in its fully elevated position of FIG. 4, the piston 43 is in its maximum position of retraction in the master cylinder 40 and the pressure on the fluid 46 is relieved with the spring 45 of the slave cylinder 41 then in its fully expanded position forcing piston 44 to its position of maximum displacement toward the intake end 41a of the slave cylinder. Depression or downward rocking of the pedal R about its pivot 50 rocks crank 55 rearwardly and thus displaces plunger 53 with piston 43 inwardly a distance through the master cylinder 40 and thus forces fluid under pressure into the slave cylinder 41 and displaces piston 44 inwardly against the biasing forces of spring 45.

The pedal R is spring biased to elevated position when the pedal depressing forces are removed therefrom by a tension spring 51 connected to the lower end of the crank arm 55 that depends from the pedal R and acting to continuously elevate the pedal and a compression spring 51a mounted on plunger rod 53 between the master cylinder 40 and the cam member 70 (to be hereinafter described) on the plunger rod.

The slave cylinder 41 is mounted and secured in rigid position on and extending forwardly from the forward side of the bracket or mounting structure 52 in axial alignment with the shaft 20 of the rearwardly located and positioned motor M on frame F and, as clearly shown in FIG. 1, the fluid line 42 extends from the rearwardly located discharge end 40b of the master cylinder, forwardly through the mounting bracket structure 52, to the forwardly located intake end 41a of the slave cylinder 41.

The piston 44 of the slave cylinder 41 includes the plunger 60 which extends axially through the cylinder and the biasing spring 45 therein, to and in axial alignment with the hub 30c of the movable face 30b of sheave 30. This plunger 60 is suitably coupled and connected at its outer end to the outer end of the hub 30c by a rotatable coupling identified generally by the reference character 61. Thus, by reciprocation of the piston 44 and its plunger 60 the face 30b of sheave 30 is moved toward and from the face 30a to thereby vary the effective pitch diameter of the belt groove provided by this sheave.

With the driver controlled actuating mechanism A constructed and mounted, as above described, when the driver-operated pedal R is unloaded and fully elevated to its inactive position by the biasing spring unit 51, the plunger 53 and piston 43 are retracted toward the end 40a of master cylinder 40. The foregoing condition permits the biasing spring 45 of the slave cylinder 40 to expand and thus force piston 44 to its maximum position of displacement toward the intake end 41a of the slave cylinder, thereby retracting plunger 60 of piston 44 and displacing the movable face 30b of sheave 30 to its position of maximum spacing from face 30a with the belt groove then having its smallest effective pitch diameter. With the sheave 30 set by the driver controlled actuating mechanism A for its smallest pitch diameter, the change in the length of belt 32 at and around sheave 30 then permits the biasing spring 31c of the spring loaded sheave 31 to take over and bias the face 31a inwardly toward the face 31b so that face 31a is then in its position of maximum inward displacement and the belt groove of sheave 31 then provides its greatest effective pitch diameter. When the face 30b of sheave 30 is forced inwardly by operation of the actuating mechanism A for varying the drive for higher speeds of cart propulsion, the effective pitch diameter of the sheave 30 is increased with the requirement for increased length of belt in and around sheave 30. This decreases the belt length available to the sheave 31 so that the belt 32 is drawn and forced inwardly between the faces 31a and 31b of sheave 31 and forces such faces apart against the forces of spring 31c, thereby correspondingly decreasing the effective pitch diameter of sheave 31 as the effective pitch diameter of the sheave 30 is increased for increasing speeds of propulsion of the cart P.

By my invention I provide the belt 32 of such a length that when the sheave 31 has its greatest effective pitch diameter and the sheave 30 has its smallest effective pitch diameter, the belt will have slippage and non-driving engagement on and with the sheaves so that when the motor M is started with the sheaves in such setting while the sheave 30 is being rotated at high speed by the motor, the belt will not make driving connection with sheave 31. This setting of the variable speed drive unit V is the neutral or non-driving condition thereof with the cart at rest and the motor M running. From this neutral position when the pedal R is depressed a slight distance, the actuating mechanism A begins to displace face 30b inwardly toward face 30a of the motor driven sheave 30 to a point where the belt 32 is in engagement with sheaves 30 and 31 so that the latter is then driven by sheave 30. This is the start or low speed position initiating propulsion of the cart P.

According to my invention and as an advantageous feature thereof, I provide for automatically closing and opening the power circuit from the batteries B to the motor M, by and in accordance with the operation by the driver of the variable speed drive controlling pedal R. In carrying out this feature, when the pedal R is fully elevated, the power circuit to the motor M is opened. Upon initial depression of the pedal R and the initiation of the operation of the drive actuating mechanism A, the power circuit is closed and such closed circuit condition continues throughout the depression of pedal R to its fully depressed position with the motor operating at all times at its full speed and torque. In reaching this condition the actuating mechanism A operates the drive D from its neutral to its driving setting and propulsion of the vehicle starts at its minimum or lowest speed.

The switch DS in the power supply circuit from the batteries B to the motor M takes the form in this present example of a normally open micro type of switch having a spring loaded, normally projected plunger 65 which in its projected position opens the switch, the spring being designated by numeral 65'. The switch DS is mounted in fixed position on a longitudinally disposed member 14a of the frame F along the inner side of the pedal operated plunger rod 53 which actuates the master cylinder 40. Referring now to FIGS. 4 and 5 of the drawings, this switch DS is provided with an actuating arm 66 having a contact head 67 at one end thereof. The arm 66 is pivotally mounted on the switch by a mounting 68 provided at the rear end of the switch with the arm 66 extending forwardly therefrom with its contact head 67 at the free end of the arm. When arm 66 is in a position swung outwardly from switch DS, it permits the spring loading of plunger 65 to project it outwardly to a position opening the switch DS. When the arm 66 is forced inwardly, it engages plunger 65 and forces the plunger inwardly to a position closing switch DS. A switch operating cam member identified generally by the reference character 70 is fixed on the pedal operated plunger rod 53. This cam member 70 provides at its forward portion an annular constant external diameter surface 71 and at its rear end provides a radially inwardly tapering annular conical surface 72 therearound. The switch operating cam member 70 is mounted on the plunger rod 53 for adjustment axially in either direction thereon, and in the example hereof, is adjusted to a position on rod 53 such that with the pedal R in its fully elevated position for an at-rest condition of the cart the nose 67 of the switch operating arm 66 is in a position engaged on the rear portion of the conical surface 72 wth the arm 66 swung outwardly from the switch plunger 65 so that the latter is in its projected position with the switch DS opening the power circuit from batteries B to the motor M. From this position as the pedal R is depressed, the cam member 70 is displaced rearwardly with the plunger rod 53 so that the head 67 of the switch operating arm 66 begins its ride inwardly over the conical surface 72 and the arm 66 is thereby forced inwardly toward and engages the switch actuating plunger 65 and forces the plunger to a position closing switch DS. The continued rearward movement of cam member 70 then holds arm 66 in a position depressing plunger 65 with the switch DS maintained in position closing the supply circuit to motor M. The rearward movement of plunger rod 53, of course, projects piston 43 into the master cylinder 40 and through piston 44 of the slave cylinder 41 begins the displacement inwardly of the movable face 30b of this sheave 30 to thereby start the increase of the effective pitch diameter of this sheave with corresponding decrease of pitch diameter of sheave 31. The continued depression of the pedal R then further projects the plunger rod 53 rearwardly so that the contact head 67 of switch arm 66 rides up onto the constant diameter surface 71 of cam member 70 where it remains throughout the further depression of the pedal R to its fully depressed position for high speed propulsion of the cart P. Of course, continued depression of pedal R operates the actuating mechanism A to progressively increase the effective pitch diameter of the sheave 30 and simultaneously progressively and correspondingly decrease the effective pitch diameter of the sheave 31 through a range of settings of increasing gear ratios until the sheaves of the drive unit D are in the high ratio (gear) position shown in FIG. 3 of the drawing for maximum speed of propulsion of the cart P.

Elevation of the pedal R from a depressed position under the action of the biasing spring unit 51 caused by the driver reducing foot pressure on the pedal, will reverse the variation of the effective pitch diameters of the sheaves 30 and 31 of the variable speed drive unit V with the pitch diameter of sheave 30 decreasing and the pitch diameter of the sheave 31 increasing for progressively slower speeds of propulsion for the cart P. As the pedal R approaches its position of maximum elevation, it will cause the actuating mechanism A for variable speed drive unit D to have varied the pitch diameters of the sheaves 30 and 31 to the neutral setting at which the belt 32 loses driving engagement with the sheave 31 with the cart then coming to rest. However, the switch DS is still maintained closed at this position and the motor M continues in operation but with propulsion of the cart stopped. Continued elevation of the pedal R then moves the cam member 71 on plunger rod 53 forwardly a sufficient distance for the cam member 71 to permit switch operating arm 66 to move outwardly for outward projection of the switch plunger 65 to a position opening switch DS and the power circuit to motor M, thereby stopping operation of the motor.

It is to be noted that the compression spring 51a on the plunger rod 53 maintains the plunger rod in position against member 70 and overcomes end play in the pivot pins and holes of the actuating linkage.

The reversing switch RS is mounted on the cart P in a location readily accessible to the driver and is operated whenever it is desired to reverse the direction of rotation of the motor M for reverse or rearward propulsion of the cart. In reverse operation the functioning of the infinitely variable speed drive unit D and its driver controlled actuating mechanism is the same as that hereinabove described for normal forward propulsion of the cart P.

While I have shown a variable speed drive actuating mechanism A of the hydraulic type incorporated with the driver operated pedal R and the drive unit D of the cart P of FIG. 1, it is to be understood that my invention is not limited to such a mechanism of the hydraulic type. If desired or found expedient, a purely mechanical actuating mechansm may be substituent and, for example, may take the form of a rack and pinion unit as more or less diagrammatically disclosed in FIG. 7 of the drawings. Referring to FIG. 7, the sheave 30 may have the sleeve 30c of its movable face 30b connected by the rotatable coupling 61, to one end of a rack bar 80, that is in operative driving connection with a pinion 81. A crank link 82 is provided connected at one end of the hub 83 of pinion 81 so that rocking of this crank link 82 to the left or to the right will effect counterclockwise or clockwise rotation of pinion 81 and thus displace sheave face 30b either toward or away from the face 30a of this sheave to thereby accordingly vary the effective pitch diameter of the sheave 30 and the sheave 31 of the variable speed drive unit D. The free end of the crank link 82 is adapted to be operatively connected to a suitable operating system of shafting and links or cranks which couples to the rear end of the plunger rod 53 that is operated by the foot pedal R, the hydraulic components of the actuating mechanism A being, of course, eliminated. Thus, by such a mechanical actuating mechanism for the drive unit D, when the pedal R is in its fully elevated position, the pinion 81 is rotated clockwise when facing FIG. 7 to draw the rack outwardly relative to the sheave 30 and thus outwardly displace the movable face 30b of the sheave for minimum pitch diameter setting thereof. Depression of the pedal R will then effect counterclockwise rotation of the pinion 81 and thus displace the rack bar 80 inwardly to move face 30b of the sheave toward face 30a thereof to thus increase the effective pitch diameter of sheave 30 for the higher speed settings of the drive unit D.

In the operation of the cart P with the driver controlled infinitely variable speed drive unit D, it will be noted that the motor M starts and attains its fullest speed of operation at the lowest current drain on the batteries B and that the drive when it starts its operation with the motor M running at its highest speed is in low gear, in this particular example, in approximately five-to-one ratio which puts five times more torque on the rear traction wheel W for propelling the cart up grades. The speed or rate of propulsion of the cart is increased from low gear ratio to high gear ratio, that is, from low speed operation to high speed operation through an infinite variation of speeds and torque through this range, by the driver of the cart through the medium of the depressable foot pedal R. For example, the cart can be under propulsion at its top or highest speed on the level with the pedal fully depressed and as the cart approaches and begins climbing a grade and the extra load is placed on the motor M, the driver can then ease off his foot pressure on pedal R so that the spring loading of this pedal will then begin elevation thereof to operate the drive actuating mechanism A to cause the sheaves of the variable speed drive unit D to assume or move to lower gear ratios. When this operation starts and is carried on, the variable speed drive unit D moves the pitch diameter settings of its sheaves 30 and 31 toward the low ratio or low gear positions which thus increases the torque on the rear traction wheels W while at the same time resulting in a lowering of the load on the motor M with the result that the motor continues to operate at its high speed with normal current consumption. The cart is thus under full control and command by the driver thereof through selective operation of the foot pedal R for any and all speeds and torque to meet the driving conditions encountered while utilizing maximum speed and torque of the motor M with minimum voltage drain on the batteries B.

It will also be evident that various other changes, modifications, variations, substitutions, eliminations and additions may be resorted to without departing from the broad spirit and scope of my invention, and hence, I do not intend or desire to limit my invention to the exact and specific examples thereof herein disclosed, except as may be required by intended specific limitations thereto appearing in any of the claims hereto appended.

What I claim is:

1. An electric powered industrial type cart including, in combination, traction wheels; an electric motor for driving said traction wheels, electric batteries; a power supply circuit from said batteries to said motor; a switch unit in said supply circuit operable to a position opening or to a position closing said supply circuit; said supply circuit constructed to supply the full voltage output of said batteries to said motor when said circuit is closed by said switch unit; said motor having a motor shaft driven thereby; an infinitely variable speed drive unit connected with said motor shaft and driven thereby; a drive mechanism connected with said traction wheels for driving said wheels; said drive mechanism including a driven shaft member connected with said variable speed drive unit and driven thereby to drive said drive mechanism and traction wheels; said infinitely variable speed drive unit including a variable pitch diameter driving sheave member mounted on and driven by said motor shaft, a variable pitch diameter driven sheave member mounted on said driven shaft member of said drive mechanism, and a belt member on and connecting said driving sheave member with and driving said driven sheave member; driver controlled and operated means operatively connected with said driving sheave member for selectively infinitely varying the pitch diameter thereof; and said driven sheave member including biasing means acting to continuously bias said driven sheave member to its maximum pitch diameter setting.

2. An electric powered industrial type cart including, in combination, traction wheels; an electric motor for driving said traction wheels, electric batteries; a power supply circuit from said batteries to said motor; a switch unit in said supply circuit operable to a position opening or to a position closing said circuit; said motor having a motor shaft driven thereby; an infinitely variable speed drive unit connected with said motor shaft and driven thereby; a drive mechanism connected with said traction wheels for driving said wheels; said drive mechanism including a driven rotary member connected with said variable speed drive unit and driven thereby; said infinitely variable speed drive unit including an infinitely variable pitch diameter driving sheave member mounted on and driven by said motor shaft and comprising a fixed face member and a movable face member displaceable toward and from said fixed face member to infinitely vary the effective pitch diameter provided therebetween; an infinitely variable pitch diameter driven sheave member mounted on and driving said driven rotary member of said drive mechanism and comprising a fixed face member and a movable face member displaceable toward and from said fixed face member to infinitely vary the effective pitch diameter provided therebetween, and a belt member on and connecting said driving sheave member with said driven sheave member for driving the latter; driver controlled and operated means connected with said movable face member of said driving sheave member for positively displacing said movable face member toward or from said fixed face member; said driver controlled means having an at-rest position with said movable face member of said driving sheave member operated thereby to and held in position with said sheave member having its minimum pitch diameter; biasing means acting to continuously bias said driver controlled means to its at-rest position; said driven sheave member having biasing means acting to continuously bias said movable face member thereof to position with said driven sheave member having its maximum pitch diameter; and said driver controlled means being operable by a driver from its at-rest position to operate said driving sheave to infinitely vary the pitch diameter thereof between its minimum pitch diameter and its maximum pitch diameter.

3. In the combination of claim 2, said switch unit operatively connected with said driver controlled means and being operated thereby to a position opening said supply circuit with said driver controlled means in its at-rest position and to position closing said supply circuit with said driver controlled means operated from its said at-rest position.

References Cited by the Examiner

UNITED STATES PATENTS

| | | | |
|---|---|---|---|
| 657,516 | 9/00 | Coleman | 318—11 |
| 657,899 | 9/00 | Coleman | 180—65 |
| 963,138 | 7/10 | Golden et al. | 74—472 X |
| 1,097,358 | 5/14 | Peck. | |
| 1,235,973 | 8/17 | Heid | 180—65 |
| 1,279,547 | 9/18 | Hueber. | |
| 2,336,002 | 12/43 | Everett. | |
| 2,346,868 | 4/44 | Perry | 74—230.17 |
| 2,731,849 | 1/56 | Rockwood et al. | |
| 2,906,357 | 9/59 | Pletka | 180—65 X |
| 3,006,428 | 10/61 | Westmont | 180—70 X |
| 3,108,481 | 10/63 | Westmont | 180—27 X |

A. HARRY LEVY, *Primary Examiner.*

PHILIP ARNOLD, *Examiner.*